(12) United States Patent
Akiyama et al.

(10) Patent No.: US 7,946,829 B2
(45) Date of Patent: May 24, 2011

(54) JET PUMP

(75) Inventors: Kiyokazu Akiyama, Okazaki (JP);
Moriyasu Goto, Toyohashi (JP);
Takahiko Kato, Nagoya (JP)

(73) Assignees: Denso Corporation, Kariya (JP);
Nippon Soken Inc., Nishio (JP)

( * ) Notice: Subject to any disclaimer, the term of this patent is extended or adjusted under 35 U.S.C. 154(b) by 1156 days.

(21) Appl. No.: 11/656,947

(22) Filed: Jan. 24, 2007

(65) Prior Publication Data

US 2007/0189908 A1   Aug. 16, 2007

(30) Foreign Application Priority Data

Feb. 14, 2006 (JP) ................................. 2006-036178

(51) Int. Cl.
*F04F 5/02* (2006.01)
*F02M 37/00* (2006.01)
(52) U.S. Cl. ........................................ 417/151; 123/509
(58) Field of Classification Search .............. 417/76–84, 417/151, 158, 182.5; 123/509
See application file for complete search history.

(56) References Cited

U.S. PATENT DOCUMENTS

| 1,350,095 | A | * | 8/1920 | Eddison | 417/54 |
| 2,275,627 | A | * | 3/1942 | Hartmann | 417/80 |
| 4,033,706 | A | * | 7/1977 | Schaefer et al. | 417/79 |
| 6,619,272 | B2 | * | 9/2003 | Jones et al. | 123/514 |
| 2004/0011337 | A1 | * | 1/2004 | Buehler | 123/514 |
| 2005/0183781 | A1 | * | 8/2005 | Vitalis et al. | 137/565.22 |

FOREIGN PATENT DOCUMENTS

GB   2 378 223 A   2/2003
JP   2002-364481   12/2002

* cited by examiner

*Primary Examiner* — Charles G Freay
*Assistant Examiner* — Patrick Hamo
(74) *Attorney, Agent, or Firm* — Nixon & Vanderhye PC

(57) ABSTRACT

A jet pump is disclosed through which a liquid flows. The jet pump includes a jet nozzle including an injection port for injecting the liquid. The jet pump also includes a throat pipe including a throat passage that extends linearly. The throat pipe includes a downstream side with an open part, and the liquid injected from the injection port flows into the throat passage. The liquid in the throat passage forms a liquid seal across a cross section of the throat passage to generate negative pressure, which introduces the liquid into the throat passage.

8 Claims, 3 Drawing Sheets

JET PUMP

CROSS-REFERENCE TO RELATED APPLICATION

This application is based on and claims priority to Japanese Patent Application No. 2006-36178, filed Feb. 14, 2006, the disclosure of which is incorporated herein by reference.

FIELD

The following relates generally to a pump and, more particularly, relates to a jet pump.

DESCRIPTION OF RELATED ART

There is known a conventional jet pump which is provided with a jet nozzle for flow of a liquid. For instance, in one embodiment, a jet pump is used for injecting fuel discharged from a fuel pump or fuel returned from an engine through an injection port. This conventional type of jet pump also includes a chamber member having a receiving chamber in fluid communication with the injection port and a throat pipe with a throat passage in communication with the receiving chamber. This type of conventional jet pump is disclosed, for example, in JP-A-2002-364481. The jet pump forces the fuel injected from the injection port to flow into the throat passage. The throat passage forms a liquid seal across a cross section thereof due to the liquid fuel therein, thereby generating a negative pressure in the receiving chamber. The negative pressure causes the fuel to be drawn in from a suction port open to the chamber member.

However, when the injection port of the jet nozzle is only partially filled with the liquid fuel (e.g., at the time of starting an operation of the jet pump), air is drawn in the liquid fuel injected from the injection port. Therefore, the liquid seal is unlikely to form in the throat passage to lower the suction force of the fuel from the suction port. As such, flow of the liquid fuel is detrimentally affected.

Furthermore, in a case where an open part at the downstream side of the throat pipe is disposed lower than the injection port, when the jet pump is stopped, the fuel remaining in the throat pipe flows out away from the injection port. Therefore, when the jet pump is subsequently activated, the air in the injection port is drawn in the liquid fuel injected from the injection port. This delays generation of the negative pressure after the start of the jet pump.

SUMMARY

A jet pump is disclosed through which a liquid flows. The jet pump includes a jet nozzle including an injection port for injecting the liquid. The jet pump also includes a throat pipe including a throat passage that extends linearly. The throat pipe includes a downstream side with an open part, and the liquid injected from the injection port flows into the throat passage. The liquid in the throat passage forms a liquid seal across a cross section of the throat passage to generate negative pressure, which introduces the liquid into the throat passage. Also, the throat passage is disposed at a positive, acute angle relative to a vector of gravity such that the open part of the throat pipe is disposed above the injection port.

A jet pump is also disclosed through which a liquid flows. The jet pump includes a jet nozzle including an injection port for injecting the liquid. The jet pump also includes a throat pipe including a throat passage. The throat pipe includes a downstream side, wherein the liquid injected from the injection port flows into the throat passage. The liquid in the throat passage forms a liquid seal across a cross section of the throat passage to generate negative pressure, which introduces the liquid into the throat passage. The jet pump further includes a cup in fluid communication with the open part of the downstream side of the throat pipe that holds liquid therein. The cup includes at least one collision wall surface that opposes the open part of the downstream side of the throat pipe. Furthermore, the collision wall surface includes a top end that is closer to the open part of the downstream side of the throat pipe than a lower end of the collision wall surface.

In addition, a jet pump is disclosed through which a liquid flows. The jet pump includes a jet nozzle including an injection port for injecting the liquid. The jet pump also includes a chamber member including a receiving chamber that is in fluid communication with the injection port, and further including a suction port for drawing in the liquid to the receiving chamber. Furthermore, the jet pump includes a throat pipe including a throat passage in fluid communication with the receiving chamber. The liquid in the throat passage forms a liquid seal across a cross section of the throat passage to generate negative pressure, which introduces the liquid into the throat passage. Additionally, the jet pump includes a core member provided in the throat pipe and extending in the flow direction of the liquid. The throat passage is defined between an inner wall of the throat pipe and an outer wall of the core member. Furthermore, a cross sectional area of the throat passage gradually decreases in a direction of liquid flow in the throat passage due to the core member.

BRIEF DESCRIPTION OF THE DRAWINGS

Other objects, features, and advantages of the present disclosure will become more apparent from the following detailed description made with reference to the accompanying drawings, in which like parts are designated by like reference numbers and in which.

DETAILED DESCRIPTION OF THE EXAMPLE EMBODIMENTS

A plurality of embodiments according to the present disclosure will be hereinafter explained with reference to the accompanying drawings.

First Embodiment

Figure 1:
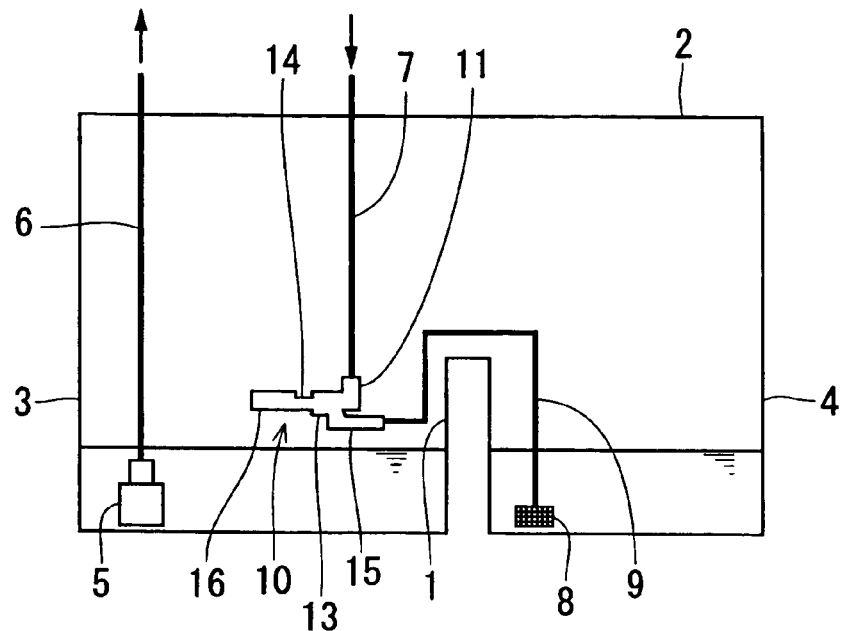
FIG. 1 is a schematic view showing one embodiment of a fuel system including a jet pump installed in a fuel tank.

FIG. 1 shows a state where a jet pump 10 in a first embodiment is installed in a fuel tank 2. The fuel tank 2 is divided into a main tank chamber 3 and a sub tank chamber 4 by a partition wall 1. As such, the fuel tank 2 generally has a saddle-type shape. In one embodiment, the fuel tank 2 has the saddle-type shape so as to meet the in-vehicle mount space.

A fuel pump 5 such as a gear pump or a vane pump is installed in the main tank chamber 3. The fuel pump 5 supplies liquid fuel in the main tank chamber 3 through a pressure pipe 6 to an engine (not shown). The engine may be of any type such as a diesel engine or a gasoline engine. The jet pump 10 transfers the liquid fuel in the sub tank chamber 4 to the main tank chamber 3. Thereby, a liquid level of the main tank chamber 3 is maintained to the extent the fuel pump 5 can draw in the liquid fuel.

An extra quantity of the fuel supplied to the engine by the fuel pump 5 enters into the jet pump 10 through a return pipe 7. The jet pump 10 operates by using flow velocity energy of the extra quantity of the liquid fuel as a drive source. Operation of the jet pump 10 causes the fuel in the sub tank chamber 4 to be transferred to the main tank chamber 3 through a filter 8 and a suction pipe 9.

Figure 2:
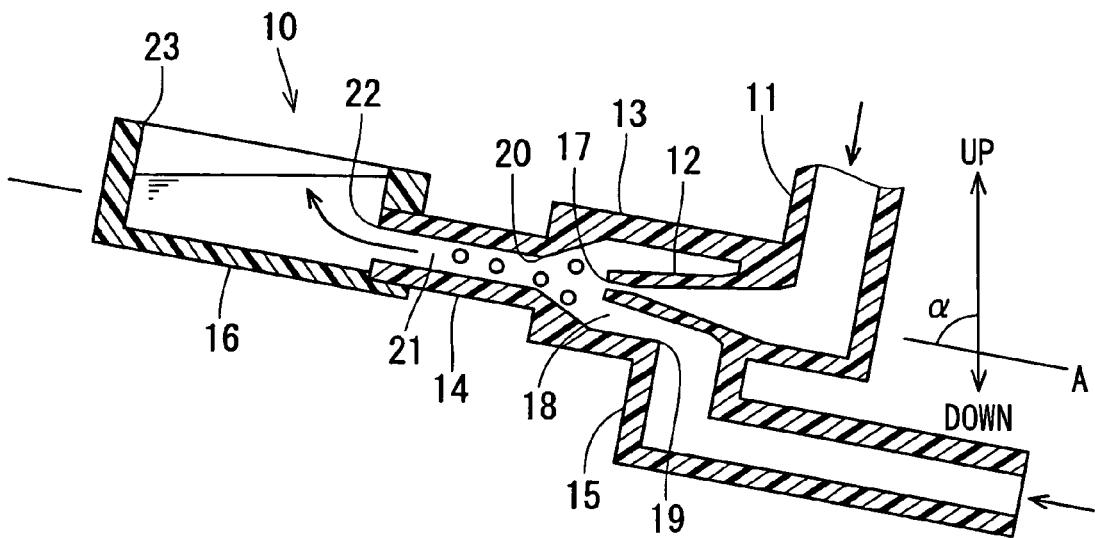
FIG. 2 is a cross sectional view of one embodiment of the jet pump.

Next, the structure of the jet pump 10 will be in detail explained with reference to FIG. 2 as a cross section of the jet pump 10. An arrow indicating each of upward and downward directions of FIG. 2 corresponds a gravity direction (i.e., the vector along which the force of gravity acts). As such, the jet pump 10 is installed in the fuel tank 2 with respect to the upward and downward direction as shown.

The jet pump 10 is provided with a return fuel suction pipe 11, a jet nozzle 12, a chamber member 13, a throat pipe 14, a transfer fuel suction pipe 15 and a cup 16. In the first embodiment, the return fuel suction pipe 11, the jet nozzle 12, the chamber member 13, the throat pipe 14 and the return fuel suction pipe 15 are integrally molded with resin. In addition, the cup 16 is made of resin and is coupled (e.g., bonded) to the throat pipe 14.

An upstream side of the return fuel suction pipe 11 is connected to the return pipe 7 and a downstream side of the return fuel suction pipe 11 is connected to the jet nozzle 12. As a result, the extra quantity of fuel from the engine is injected to an injection port 17 of the jet nozzle 12 through the return pipe 7 and the return fuel suction pipe 11. In one embodiment, the axial cross section of the injection port 17 is circular in shape.

The chamber member 13 includes a receiving chamber 18 that is in fluid communication with the injection port 17. The injection port 17 is received into the receiving chamber 18. The chamber member 13 further includes a suction port 19 for drawing fuel into the receiving chamber 18 due to negative pressure. The chamber member 13 also includes a discharge port 20 for discharging the fuel from the receiving chamber 18 into the throat pipe 14. Thus, the chamber member 13 includes openings at the suction port 19 and the discharge port 20 for fluid flow, and the receiving chamber 18 provides fluid communication between the injection port 17 and the throat pipe 14.

The transfer fuel suction pipe 15 is connected to the suction port 19 and the throat pipe 14 is connected to the discharge port 20. The suction port 19 is positioned upstream of the injection port 17 in the receiving chamber 18 and the discharge port 20 is positioned downstream of the injection port 17 in the receiving chamber 18. In the embodiment shown, the receiving chamber 18 is cylindrical in shape and encompasses the jet nozzle 12. The portion of the receiving chamber 18 adjacent the discharge port 20 has a conical shape with an axial cross sectional area that decreases in the direction of fluid flow.

The throat pipe 14 is formed in a cylindrical shape and includes a throat passage 21 extending linearly through the throat pipe 14. The throat pipe 14, the throat passage 21, and the injection port 17 each share a common axis, A. The axis, A, of the throat pipe 14, the throat passage 21, and the injection port 17 is disposed at a positive acute angle a relative to a vector of gravity due to the mounting of the jet pump 1 in the vehicle as shown in FIG. 2. Accordingly, the open part 22 at the downstream side of the throat pipe 14 is positioned above the injection port 17 relative to the vector of gravity.

The cup 16 is communicated with the open part 22 at the downstream side of the throat pipe 14 to reserve the fuel therein. The cup 16 includes a cup open part 23 opened upward. In one embodiment, the cup 16 is rectangular in shape and the cup open part 23 is also rectangular. As fuel flows into the cup 16, the fuel spills out over the cup open part 23 and flows into the main tank chamber 3.

During operation, the electric fuel pump 5 causes an extra quantity of the fuel among the fuel supplied to the engine to enter into the return fuel suction pipe 11 of the jet pump 10 through the return pipe 7, and the jet pump 10 injects the fuel from the injection port 17. The fuel injected from the injection port 17 flows into the throat passage 21 through the receiving chamber 18. Fuel flows in the throat passage 21 while forming a liquid seal (i.e. liquid film) across a cross section of the throat passage 21. The liquid seal generates a negative pressure as a suction pressure in the receiving chamber 18 for drawing fuel from the sub tank chamber 4 into the receiving chamber 18 through the suction port 19 and to introduce additional fuel into the throat passage 21.

The fuel drawn in from the suction port 19 flows into the cup 16 together with the fuel injected from the jet nozzle 12 through the throat passage 21. As additional fuel flows into the cup 16, fuel spills out from the cup open part 23 and flows out into the main tank chamber 3. As described above, the fuel in the sub tank chamber 4 is transferred into the main tank chamber 3 through the return pipe 7 by using the flow velocity energy of the fuel flown into the jet pump 10 as a drive source. Thus, the jet pump 10 transfers the fuel in the sub tank chamber 4 to the main tank chamber 3 over the partition wall 1.

In addition, when the fuel inflow from the return pipe 7 to the jet pump 10 is stopped by terminating operation of the fuel pump 5 or the like, the fuel injection from the injection port 17 is stopped. Further, according to the first embodiment, since the axis of the throat pipe 14 is positioned at an upward, acute angle a relative to the vector of gravity, the fuel reserved in the cup 16 flows toward the throat passage 21 by gravity immediately after the fuel injection from the injection port 17 is stopped.

Therefore, the chamber member 13 is filled with the remaining fuel and the injection port 17 is filled with the remaining fuel. As a result, when the jet pump 10 is subsequently activated, less air is drawn in the fuel injected from the injection port 17. Accordingly, the liquid seal is formed in the throat passage 21 and the fuel can be transferred more promptly after the jet pump 10 is activated.

In addition, according to the first embodiment, since the throat passage 21 is positioned at an upward, acute angle, α, when the jet pump 10 is stopped, the air contained in the remaining fuel in the chamber member 13 and in the throat passage 21 flows more easily out from the open part 22 at the downstream side of the throat passage 21. Therefore, when the jet pump 10 is activated, less air is included in the fuel injected from the injection port 17.

It is noted that the suction pipe 9 bends upwards and over the partition wall 1. Therefore, when the jet pump 10 is stopped, fuel in the chamber member 13 flows out in reverse flow from the suction pipe 9, and therefore, the injection port 17 of the jet nozzle 12 is more likely to be filled with the fuel.

Second Embodiment

Figure 3:
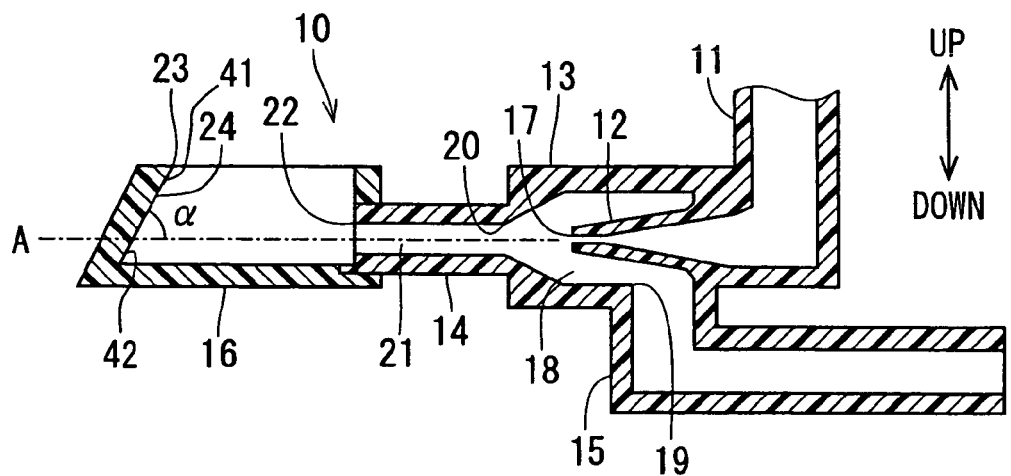
FIG. 3 is a cross sectional view of another embodiment of the jet pump.

FIG. 3 is a cross section showing a jet pump 10 in a second embodiment and an arrow indicating the vector of gravity.

In this embodiment, the cup 16 is in fluid communication with the open part 22 of the downstream side of the throat pipe 14. The cup 16 is cubic in shape and includes an open part 23 at a top end such that the cup 16 can hold fuel and can allow the fuel to flow out of the open part 23.

The cup also includes at least one collision wall surface 24 that opposes the open part 22 of the downstream side of the throat pipe 14 such that fuel flowing from the open part 22 flows toward the collision wall surface 24. The collision wall surface 24 includes a top end 41 adjacent the open part 23 of the cup 16. The collision wall surface 24 also includes a bottom end 42 opposite to the top end 41. Relative to the direction of the axis, A, of the throat pipe 14, the top end 41 of the collision wall surface 24 is closer to the open part 22 of the downstream side of the throat pipe 14 than the lower end 42 of the collision wall surface 24. Specifically, in the embodiment shown, collision wall surface 24 is disposed at a positive, acute angle, α', relative to the axis, A, of the throat pipe 14 such that the top end 41 is closer to the open part 22 than the lower end 42.

Therefore, fuel discharged from the throat pipe 14 and flowing into the collision wall surface 24 is more likely to flow downward. Accordingly, the fuel is less likely to flow out of the cup open part 23, thereby increasing the amount of fuel in the cup 16 at the time of injecting the fuel from the jet nozzle 12.

As a result, when the jet pump 10 is stopped, there is likely to be more fuel flowing from the cup 16 toward the receiving chamber 18. Thereby, when the fuel injection from the jet nozzle 12 is restarted, less air will be included in the fuel injected from the injection port 17. Therefore, the fuel can be transferred more promptly after starting the jet pump 10.

Third Embodiment

Figure 4:
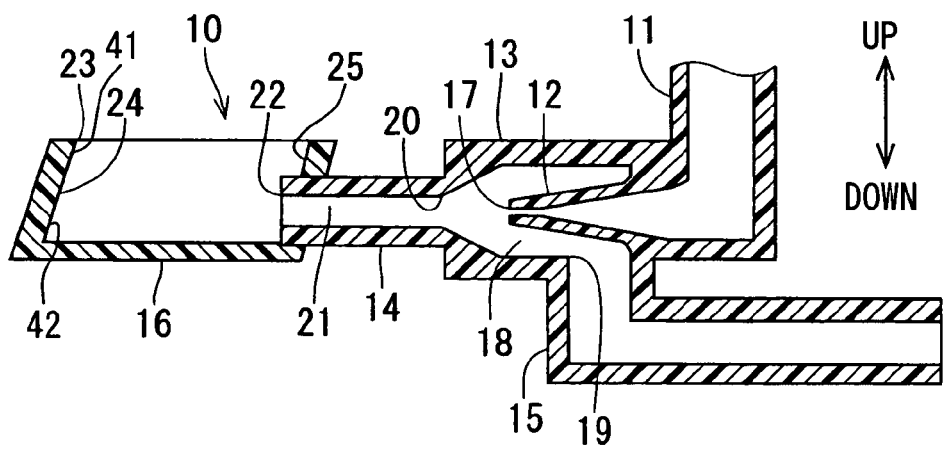
FIG. 4 is a cross sectional view of another embodiment of the jet pump.

FIG. 4 is a cross section showing a jet pump 10 in a third embodiment and an arrow indicating the vector of gravity. In this embodiment, the cup 16 includes at least one collision wall surface 24 that opposes the open part 22 of the downstream side of the throat pipe 14 such that fuel flowing from the open part 22 flows toward the collision wall surface 24. The collision wall surface 24 includes a top end 41 adjacent the open part 23 of the cup 16. The collision wall surface 24 also includes a bottom end 42 opposite to the top end 41. Relative to the direction of the axis, A, of the throat pipe 14, the top end 41 of the collision wall surface 24 is closer to the open part 22 of the downstream side of the throat pipe 14 than the lower end 42 of the collision wall surface 24 similar to the second embodiment shown in FIG. 3.

Furthermore, in this embodiment, the cup 16 includes an opposing wall surface 25 that is spaced from and is opposite from the collision wall surface 24. Also, the opposing wall surface 25 is disposed approximately parallel to the collision wall surface 24.

Therefore, for resin-molding the cup 16, the mold tool can be extracted from the mold in a direction parallel with both of the wall surfaces 24, 25. Accordingly, manufacture of the cup 16 is facilitated.

In another embodiment, the cup 16 includes a plurality of sections. One of these sections includes the collision wall surface 24, and another of these sections includes the opposing wall surface 25. As such, the collision wall surface 24 and the opposing wall surface 25 can be disposed at different angles relative to each other, and yet the cup 16 can be manufactured relatively easily.

Fourth Embodiment

Figure 5:
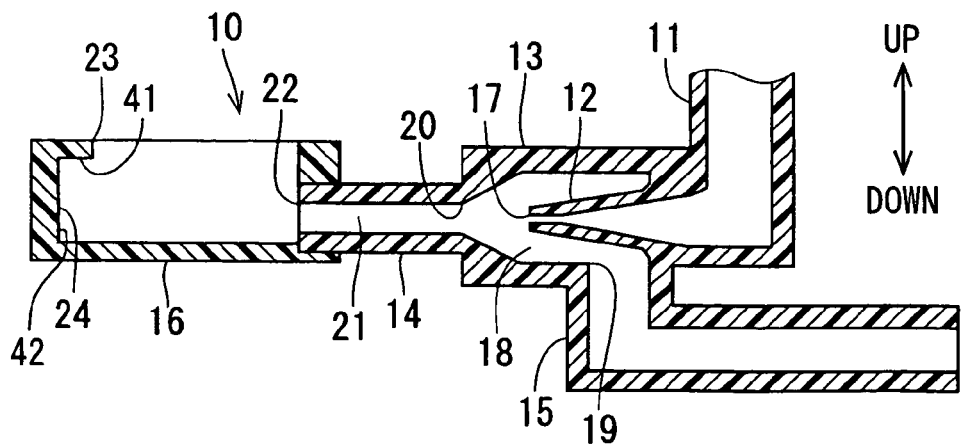
FIG. 5 is a cross sectional view of another embodiment of the jet pump.

FIG. 5 is a cross section showing a jet pump 10 in a fourth embodiment and an arrow indicating the vector of gravity. In this embodiment, the cup 16 includes at least one collision wall surface 24 that opposes the open part 22 of the downstream side of the throat pipe 14 such that fuel flowing from the open part 22 flows toward the collision wall surface 24. The collision wall surface 24 includes a top end 41 adjacent the open part 23 of the cup 16. The collision wall surface 24 also includes a bottom end 42 opposite to the top end 41. Relative to the direction of the axis, A, of the throat pipe 14, the top end 41 of the collision wall surface 24 is closer to the open part 22 of the downstream side of the throat pipe 14 than the lower end 42 of the collision wall surface 24 similar to the second embodiment shown in FIG. 3. Specifically, the collision wall surface 24 extends substantially in a direction perpendicular to the axis, A, of the throat pipe 14. However, the top end 41 of the collision wall surface 24 extends back toward the downstream side of the throat pipe 14.

As such, the top end 41 of the collision wall surface 24 reduces the size of the open part 23 of the cup 16. Therefore, the fuel discharged from the throat pipe 14, flows toward the collision wall surface 24. Some of the fuel that flows toward the open part 23 of the cup 16 is directed downward by the top end 41 of the collision wall surface 24. As a result, when the jet pump 10 is stopped, there is likely to be more fuel flowing from the cup 16 toward the receiving chamber 18. Thereby, when the fuel injection from the jet nozzle 12 is restarted, less air will be included in the fuel injected from the injection port 17. Therefore, the fuel can be transferred more promptly after starting the jet pump 10.

Fifth Embodiment

Figure 6:
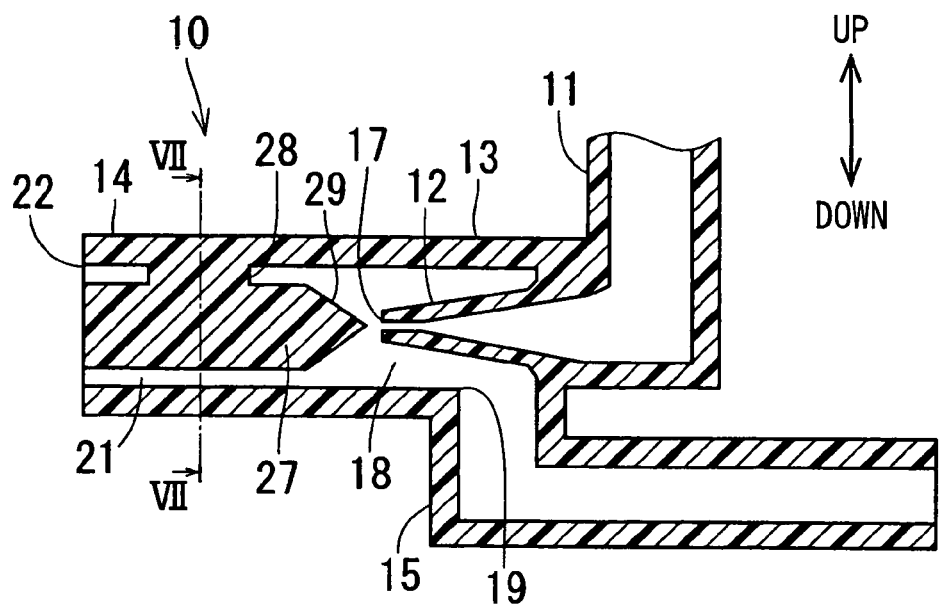
FIG. 6 is a cross sectional view of another embodiment of the jet pump.
Figure 7:
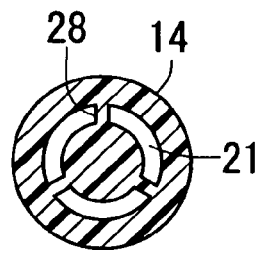
FIG. 7 is a cross sectional view of the jet pump of FIG. 6 taken along lines VII-VII.

FIG. 6 is a cross section showing a jet pump 10 in a fifth embodiment and an arrow indicating the vector of gravity. FIG. 7 is a view showing a cross section taken along lines VII-VII of FIG. 6.

In this embodiment, a core member 27 is provided in the throat pipe 14 and extends in the flow direction of the fuel. Therefore, a throat passage 21 is defined between the inner wall of the throat pipe 14 and an outer wall of the core member 27. In one embodiment, the core member 27 is made of resin and is coupled to the inner surface of the throat pipe 14 through a plurality of connecting members 28. As shown in FIG. 7, the connecting members 28 are spaced evenly around the axis of the throat pipe 14.

A cross sectional area off the throat passage 21 gradually decreases in the direction of fluid flow of the fuel due to the core member 27. Specifically, in the embodiment shown, an upstream end 29 at the upstream side of the core member 27 has a conic surface. A leading portion of the upstream end 29 at the upstream side is substantially aligned with the axis of the injection port 17. In addition, a jet nozzle 12, the throat pipe 14, and the core member 27 are arranged so as to be substantially coaxial.

As such, the throat passage 21 can more easily fill with fuel. Accordingly, even when the jet pump 10 is activated and the fuel quantity flowing in the throat passage 21 is relatively small, the liquid seal is likely to form in the throat passage 21 and a negative pressure in the receiving chamber 18 can be sufficiently generated. As a result, the fuel can be transferred more promptly after the jet pump 10 is activated.

Furthermore, even if the central axis of the jet nozzle 12 is spaced from the axis of the throat passage 21, the fuel injected from the jet nozzle 12 flows toward the core member 27 and thereafter, spreads uniformly away from the core member 27. As such, air is less likely to be drawn into the throat passage 21, and the throat passage 21 is more likely to fill with the fuel. Accordingly, a negative pressure in the receiving chamber 18 can be sufficiently generated.

Sixth Embodiment

Figure 8:
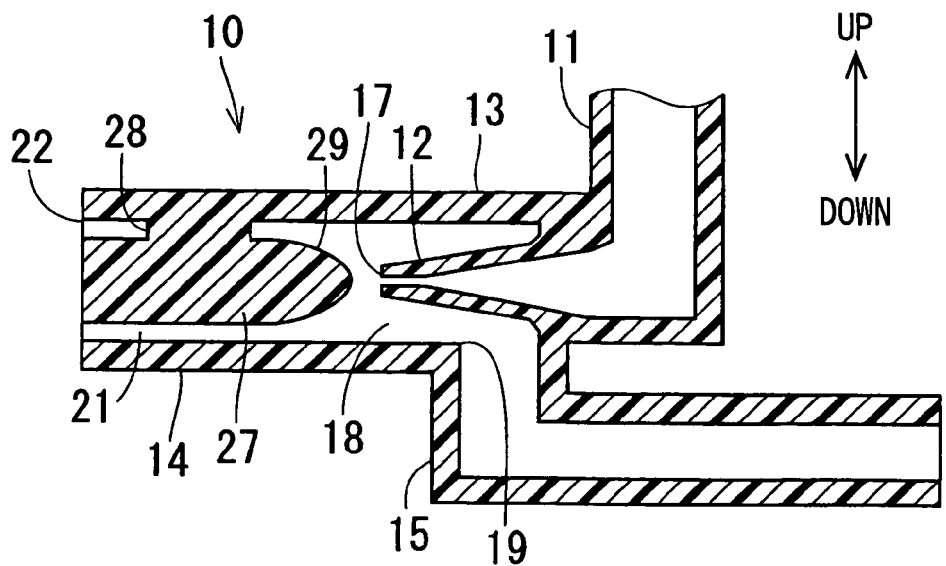
FIG. 8 is a cross sectional view of another embodiment of the jet pump.

FIG. 8 is a cross section showing a jet pump 10 in a sixth embodiment and an arrow indicating the vector of gravity. In this embodiment, the upstream end 29 of the core member 27 has a convex, curved surface. As such, the throat passage 21 can more easily fill with fuel as described above in relation to FIGS. 6 and 7.

Other Embodiments

In the first embodiment, the throat pipe 14 may be bent in places instead of being entirely linear.

In addition, in the first embodiment, the jet pump 10 is provided with the cup 16. However, in another embodiment, the jet pump 10 does not include the cup 16.

In the second to sixth embodiments, the throat pipe 14 is located horizontally, but the top end of the open part 22 at the downstream side of the throat pipe 14 may be above the top end of the injection port 17 as in the case of the first embodiment.

In the fifth and sixth embodiments, the upstream end 29 at the upstream side of the core member 27 is located in the throat passage 21, but the upstream end 29 at the upstream side may be located in the receiving chamber 18 of the chamber member 13.

In addition, in the fifth and sixth embodiments, a portion of the receiving chamber 18 close to the discharge port 20 may be formed in a conical shape as in the case of the first embodiment.

Further, the throat pipe 14 in the fifth and sixth embodiments may be provided with the cup 16 similar to that in the first and fourth embodiments.

In each of the above embodiments, an extra quantity of the fuel among the fuel supplied from the fuel pump 5 to the engine operates the jet pump 10. However, in another embodiment, the fuel may be directly supplied from the pump 5 to the jet pump 10 instead of via the engine. For example, the fuel may be branched from the pressure pipe 6 to be supplied to the jet pump 10 or the fuel at a low-pressure side of the pressure regulator provided in the fuel pump 5 may be supplied to the jet pump 10.

In each of the above embodiments, in a case where the fuel tank 2 is formed in a saddle shape, the jet pump 10 is applied for transferring the fuel from the sub tank chamber 4 to the main tank chamber 3. However, the jet pump 10 may be employed in other configurations. For instance, in a case where a pump chamber for receiving the fuel pump 5 is installed in the fuel tank 2 and the fuel pump 5 can draw in the fuel even if the vehicle is inclined, the jet pump 5 may be applied for transferring the fuel from the fuel tank 2 to the pump chamber.

While only the selected example embodiments have been chosen to illustrate the present invention, it will be apparent to those skilled in the art from this disclosure that various changes and modifications can be made therein without departing from the scope of the invention as defined in the appended claims. Furthermore, the foregoing description of the example embodiments according to the present invention is provided for illustration only, and not for the purpose of limiting the invention as defined by the appended claims and their equivalents.

What is claimed is:

1. A jet pump, which is adapted to be provided in a tank and through which a liquid flows, comprising:
    a jet nozzle including an injection port for injecting the liquid;
    a throat pipe including a throat passage, the throat pipe including a downstream side, wherein the liquid injected from the injection port flows into the throat passage, wherein:
    the liquid in the throat passage forms a liquid seal across a cross section of the throat passage to generate negative pressure, which introduces the liquid into the throat passage; and
    a cup in fluid communication with an open part of the downstream side of the throat pipe that holds liquid therein, wherein:
    the cup includes at least one collision wall surface that opposes the open part of the downstream side of the throat pipe;
    the at least one collision wall surface includes a top end and a lower end;
    a first distance from the top end to a plane, which is at the open part of the throat pipe and is perpendicular to an axis of the throat pipe, in a direction parallel to the axis, is smaller than a second distance from the lower end to the plane in the direction parallel to the axis;
    the axis is parallel to a bottom surface of the tank; and
    the jet pump is provided in the tank such that the throat passage extends in a direction of the axis of the throat pipe and such that the cup opens in a direction opposite from the bottom surface of the tank.

2. A jet pump according to claim 1, wherein the at least one collision wall surface is disposed at a positive, acute angle relative to said axis of the throat pipe such that the top end of the at least one collision wall surface is closer to the downstream side of the throat pipe than a lower end of the at least one collision wall surface.

3. A jet pump according to claim 2, wherein the cup further includes an opposing wall surface that is spaced from and is opposite from the at least one collision wall surface, wherein the opposing wall surface is disposed approximately parallel to the at least one collision wall surface.

4. A jet pump according to claim 1, wherein the top end of the at least one collision wall surface extends toward the downstream side of the throat pipe.

5. A jet pump according to claim 1, further comprising:
    a core member provided in the throat pipe and extending in a flow direction of the liquid; wherein:
    the throat passage is defined between an inner wall of the throat pipe and an outer wall of the core member;
    a cross sectional area of the throat passage gradually decreases in the direction of liquid flow in the throat passage due to the core member.

6. A jet pump according to claim 1, further comprising a chamber member including a receiving chamber providing fluid communication between the injection port and the throat passage, the chamber member further including a suction port for drawing the liquid into the receiving chamber due to negative pressure.

7. A jet pump according to claim 1, wherein the tank is divided by a partition wall into a main tank chamber and a sub tank chamber, and wherein the jet pump transfers the liquid in the sub tank chamber to the main tank chamber over the partition wall.

8. A supply system comprising:
   a tank; and
   a jet pump which is provided in the tank and through which a liquid flows, the jet pump including:
   a jet nozzle including an injection port for injecting the liquid; and
   a throat pipe including a throat passage that extends linearly, the throat pine including a downstream side with an open part, wherein:
   the liquid injected from the injection port flows into the throat passage;
   the liquid in the throat passage forms a liquid seal across a cross section of the throat passage to generate negative pressure, which introduces the liquid into the throat passage;
   the throat passage is disposed such that in a direction perpendicular to a plane of a bottom surface of the tank, the open part of the throat pipe is always disposed above the injection port; and
   the throat pipe, the throat passage, and the injection port share a common axis, the common axis being disposed at a positive acute angle relative to a vector of gravity due to a mounting of the jet pump in a vehicle whereby the open part at the downstream side of the throat pipe is positioned above the injection port relative to the vector of gravity.

* * * * *